US009242436B1

(12) United States Patent
Hallman et al.

(10) Patent No.: US 9,242,436 B1
(45) Date of Patent: Jan. 26, 2016

(54) TRANSACTION CARDS AND SYSTEM

(71) Applicant: Electronic Data Magnetics, Inc., High Point, NC (US)

(72) Inventors: H. Russell Hallman, Thomasville, NC (US); John Trentman, Winston-Salem, NC (US)

(73) Assignee: Electronic Data Magnetics, Inc., High Point, NC (US)

( * ) Notice: Subject to any disclaimer, the term of this patent is extended or adjusted under 35 U.S.C. 154(b) by 0 days.

(21) Appl. No.: 14/479,727

(22) Filed: Sep. 8, 2014

(51) Int. Cl.
*G06K 19/06* (2006.01)
*B32B 27/06* (2006.01)
*B32B 7/12* (2006.01)
*B32B 29/00* (2006.01)
*B65D 83/08* (2006.01)
*G06K 19/077* (2006.01)

(52) U.S. Cl.
CPC . *B32B 27/06* (2013.01); *B32B 7/12* (2013.01); *B32B 29/002* (2013.01); *B65D 83/0811* (2013.01); *G06K 19/07722* (2013.01); *B32B 2425/00* (2013.01)

(58) Field of Classification Search
CPC .................. G06K 19/007749; G06K 19/0776
USPC .......................................... 235/487, 492, 483
See application file for complete search history.

(56) References Cited

U.S. PATENT DOCUMENTS

| | | | | |
|---|---|---|---|---|
| 4,042,147 A * | 8/1977 | Lee | | 221/225 |
| 4,326,643 A | 4/1982 | Bayne et al. | | 221/13 |
| 5,760,381 A | 6/1998 | Stich et al. | | 235/380 |
| 6,994,262 B1 * | 2/2006 | Warther | | 235/492 |
| 7,835,047 B1 * | 11/2010 | Raiford | | 359/2 |
| 8,393,547 B2 | 3/2013 | Kiekhaefer et al. | | 235/492 |
| 8,585,852 B2 | 11/2013 | Warther | | 156/257 |
| 2003/0022973 A1 | 1/2003 | Hung et al. | | 524/270 |
| 2003/0061745 A1 * | 4/2003 | Santarpia | | 40/124.06 |
| 2009/0006262 A1 * | 1/2009 | Brown et al. | | 705/64 |
| 2011/0031319 A1 * | 2/2011 | Kiekhaefer et al. | | 235/492 |
| 2012/0038445 A1 * | 2/2012 | Finn | | 336/105 |
| 2013/0020118 A1 | 1/2013 | Ito et al. | | 174/259 |

FOREIGN PATENT DOCUMENTS

| | | |
|---|---|---|
| CA | 2347818 | 5/2000 |
| EP | 1663827 | 6/2006 |
| EP | 2436745 | 4/2012 |
| EP | 2394939 | 6/2012 |

OTHER PUBLICATIONS

Lay, Dennis G , et al. , "Polyurethane Adhesives," Ch. 34, The Dow Chemical Company, Freeport, Texas, 2003.

* cited by examiner

*Primary Examiner* — Daniel St Cyr
(74) *Attorney, Agent, or Firm* — MacCord Mason PLLC

(57) ABSTRACT

A transaction and proximity cards having an improved construction and systems for utilizing such cards. The card system includes a card having only one top ply and only one bottom ply and a layer of high elongation adhesive between each of the only one top ply and the only one bottom ply. In one card embodiment, the card further includes at least one inlay between the only one top ply and the only one bottom ply and a layer of high elongation adhesive between each of the only one top ply and the only one bottom ply and the at least one inlay. In addition, the card system includes card dispensers adapted to dispense the cards.

60 Claims, 9 Drawing Sheets

TRANSACTION CARDS AND SYSTEM

BACKGROUND OF THE INVENTIONS (1) Field

The present inventions relate generally to transaction cards and, more particularly, to transaction and proximity cards having an improved construction and systems for utilizing such cards.

(2) Related Art

Transaction cards have been currently adapted for a wide variety of uses, most commonly as a method of payment in commercial transactions. For example, a user may purchase a fare for transportation at a kiosk.

The growing popularity of near field communication (NFC) technologies such as radio-frequency identification (RFID) tags has resulted in its implementation in proximity cards as well. The kiosk may dispense a NFC-containing card with the number of uses stored within. The user may quickly pay for the transportation by simply scanning the card upon entering the vehicle. Ideally, these cards should be cheaply produced, such that when the card expires it may simply be disposed of.

Proximity cards incorporating NFC technologies have been limited in design due to structural constraints. The proximity cards must be built with sufficient durability such that the RFID tags contained within do not become destroyed and nonfunctional with nominal wear and tear. These cards have been required to be of higher thickness due to the multiple layers needed to accommodate its use as a NFC device.

Thus, there remains a need for new and improved transaction and proximity cards and systems which includes a card having only one top ply and only one bottom ply and a layer of high elongation adhesive between each of the only one top ply and the only one bottom ply which reduces the cost to produce the cards while, at the same time, provides a level of appearance, strength and durability comparable or greater than conventional multilayer stacked cards.

SUMMARY OF THE INVENTIONS

The present inventions are directed to transaction and proximity cards having an improved construction and systems for utilizing such cards. The card system includes a card having only one top ply and only one bottom ply and a layer of high elongation adhesive between each of the only one top ply and the only one bottom ply. In one proximity card embodiment, the card further includes at least one inlay between the only one top ply and the only one bottom ply and a layer of high elongation adhesive between each of the only one top ply and the only one bottom ply and the at least one inlay. In addition, the card system includes card dispensers adapted to dispense the cards.

In one embodiment, the high elongation adhesive is a reactive hot melt polyurethane adhesive. Also, the reactive hot melt polyurethane adhesive may be polymerized in the presence of moisture.

In one embodiment, the reactive hot melt polyurethane adhesive has a glass transition temperature Tg less than about 32 degrees F. (0 degrees C.) as tested according to ASTM E1356-08(2014). In another embodiment, the reactive hot melt polyurethane adhesive has a glass transition temperature Tg less than about 15 degrees F. (−10 degrees C.) as tested according to ASTM E1356-08(2014). In still another embodiment, the reactive hot melt polyurethane adhesive has a glass transition temperature Tg of about 5 degrees F. (−15 degrees C.) as tested according to ASTM E1356-08(2014).

In one embodiment, the reactive hot melt polyurethane adhesive has a tensile strength greater than about 1500 psi (10 MPa) as tested according to ASTM D638-10. In another embodiment, the reactive hot melt polyurethane adhesive has a tensile strength greater than about 2500 psi (17 MPa) as tested according to ASTM D638-10. In still another embodiment, the reactive hot melt polyurethane adhesive has a tensile strength of about 3000 psi (20 MPa) as tested according to ASTM D638-10.

In one embodiment, the reactive hot melt polyurethane adhesive has an elongation greater than about 500% as tested according to ASTM D638-10. In another embodiment, the reactive hot melt polyurethane adhesive has an elongation of about 600% as tested according to ASTM D638-10.

Each of the reactive hot melt polyurethane adhesive layers may be about one mil in thickness per layer.

In one embodiment, the at least one inlay is an RFID tag. The RFID tag may be a near field tag. The at least one inlay may be about 2½ mils in thickness.

In one embodiment, the total thickness of the card is between about 5 and 35 mils. In another embodiment, the total thickness of the card is about 30 mils.

The card also may be a die cut card.

In one embodiment, the card dispenser is a magazine fed card dispenser. The magazine fed card dispenser may include a feed magazine, at least one feed roll, and a metering gate. In another embodiment, the card dispenser is a roll stock card dispenser.

The card system may further includes a card initialization module. The card initialization module may include a cut card on roll mechanism, feed rollers, printer and delivery chute.

The card may be formed of paper, plastic and combinations thereof. In one embodiment, the plastic is a thermoplastic. The thermoplastic may be selected from the group consisting of polyester, polypropylene, PVC and mixtures thereof.

In one embodiment, the only one top ply and the only one bottom ply are between about 1½ mils and about 20 mils in thickness per ply.

The card may further include a coating for providing scratch resistance during normal use of the card, wherein the coating is applied to at least one outer surface of one of the only one top ply and the only one bottom ply.

The card may further include a coating for providing sticking resistance between adjacent cards when the card is dispensed, wherein the coating is applied to at least one outer surface of one of the only one top ply and the only one bottom ply.

The card may further include a coating for reducing the coefficient of friction between adjacent cards when the card is dispensed, wherein the coating is applied to at least one outer surface of one of the only one top ply and the only one bottom ply.

The card may further include indicia applied to at least one outer surface of one of the only one top ply and the only one bottom ply. The indicia may include identification, customer name, disclaimers on back, customer logo, dollar amount, signature panel, time period for use, and combinations thereof.

Accordingly, one aspect of the present inventions is to provide a transaction card system, the card includes (a) only one top ply; (b) only one bottom ply; and (c) a layer of high elongation adhesive between the only one top ply and the only one bottom ply.

Another aspect of the present inventions is to provide a proximity card, the card includes (a) only one top ply; (b) only one bottom ply; (c) at least one inlay between the only one top ply and the only one bottom ply; and (d) a layer of high elongation adhesive between each of the only one top ply and the only one bottom ply and the at least one inlay.

Still another aspect of the present invention is to provide a proximity card system, the card system includes (a) a card having (i) only one top ply, (ii) only one bottom ply; (iii) at least one inlay between the only one top ply and the only one bottom ply; and (iv) a layer of high elongation adhesive between each of the only one top ply and the only one bottom ply and the at least one inlay; and (b) a card dispenser adapted to dispense the card.

These and other aspects of the present invention will become apparent to those skilled in the art after a reading of the following description of the embodiments when considered with the drawings.

DESCRIPTION OF THE EMBODIMENTS

Figure 1:
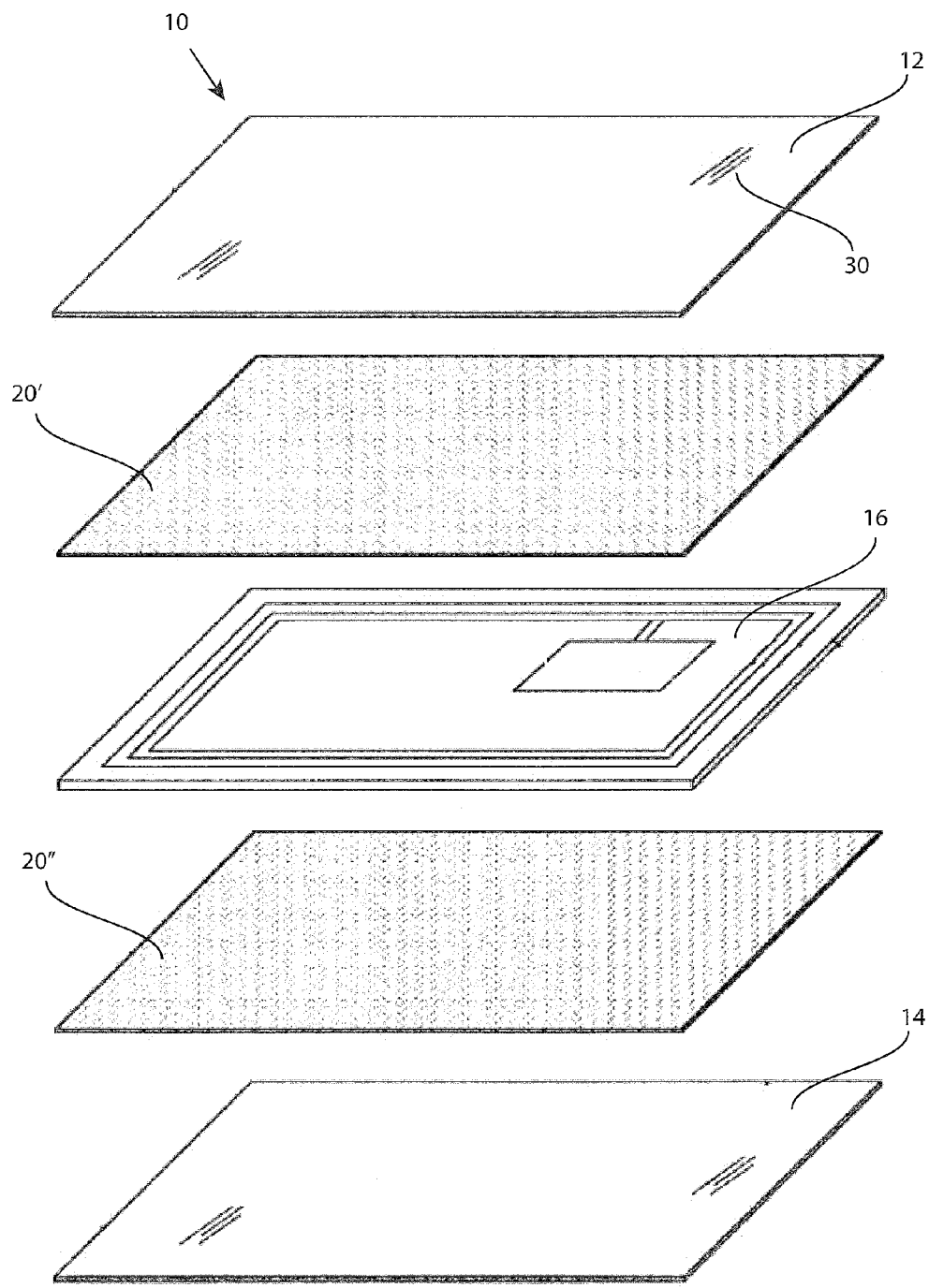
FIG. 1 is an exploded view of a proximity card with a NFC device constructed according to the present inventions.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 2:
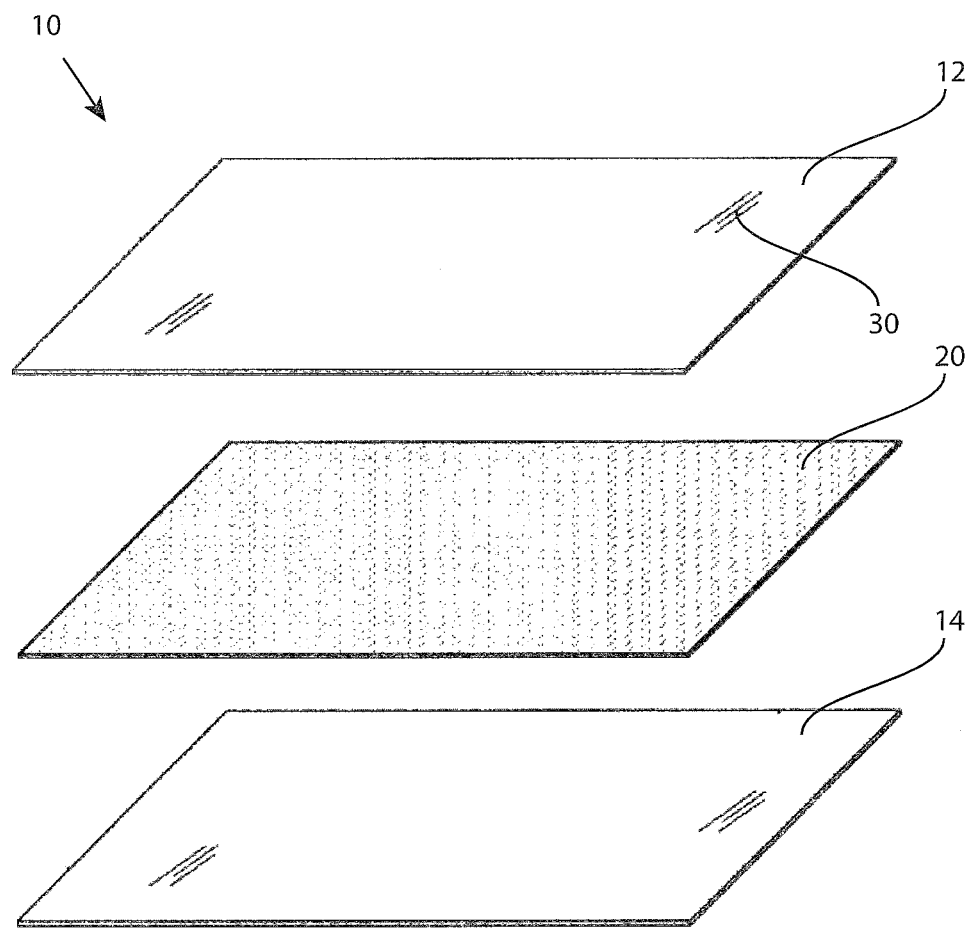
FIG. 2 is an exploded view of an alternative embodiment of the present inventions for a transaction card without a NFC device.

Referring now to the drawings in general and FIG. 1 in particular, it will be understood that the illustrations are for the purpose of describing embodiments of the inventions and are not intended to limit the inventions thereto. As best seen in FIG. 1, one embodiment of a proximity card, generally designated 10, is shown constructed to the present inventions in an exploded view. An alternative embodiment of the present inventions is shown in FIG. 2.

The card 10 includes a top ply 12, a bottom ply 14, an inlay 16 sandwiched between the top ply 12 and bottom ply 14, a layer of adhesive 20' applied between top ply 12 and one face of the inlay 14, and another layer of adhesive 20" applied between bottom ply 14 and the opposing face of the inlay 16. The card 10 may be formed of paper, plastic and combinations thereof. The plastic may be a thermoplastic such as polyester, polypropylene, PVC and mixtures and combinations thereof. Each ply may further include a coating 30 on its outer surface to provide scratch resistance 30', sticking resistance 30", to reduce the coefficient of friction between adjacent cards when the card is dispensed 30''', and any combination of coatings thereof. The card 10 may be die cut.

Figure 3A:
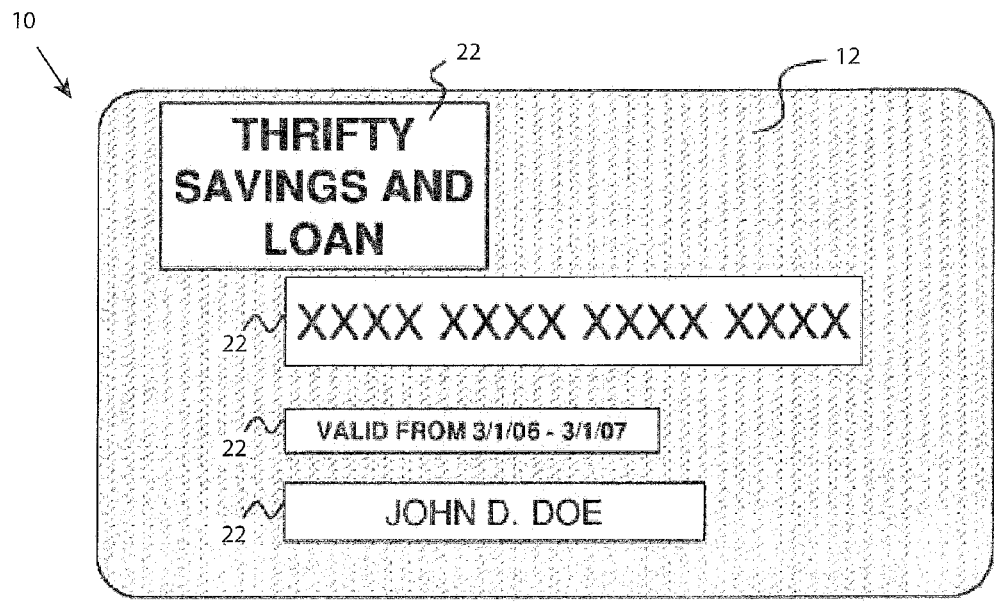
FIG. 3A is a front view of the proximity card shown in FIG. 1.
Figure 3B:
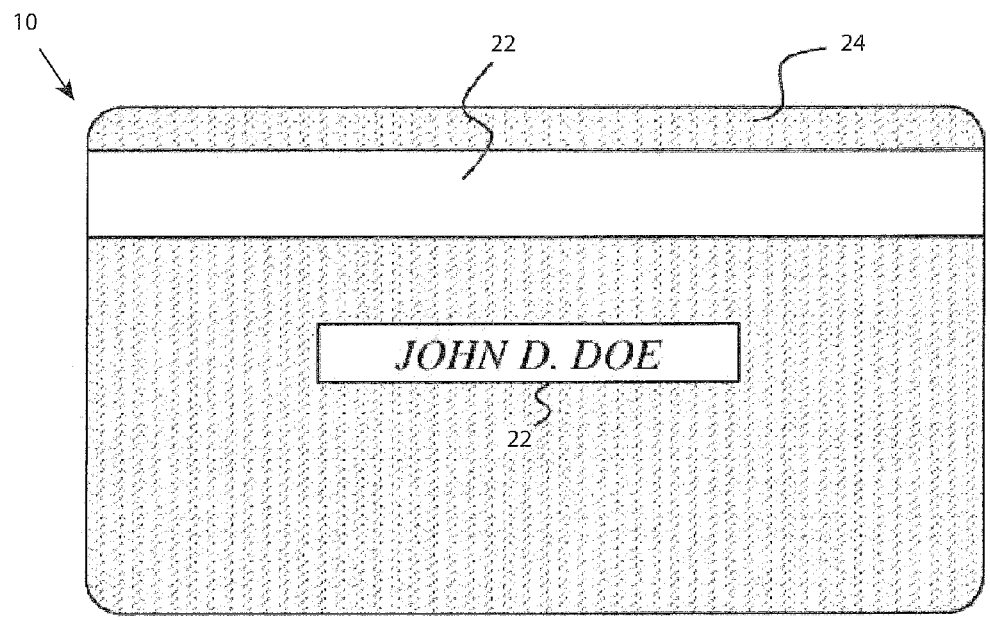
FIG. 3B is a back view of the proximity card shown in FIG. 1.

As shown in FIGS. 3A and 3B, the card 10 may include indicia 22 applied to the outer surface of the top ply 12, bottom ply 14, or both. Any type of indicia 22 may be applied to the card, including identification, customer name, disclaimers, customer logo, dollar amounts; signature panel, time periods for use, and combinations thereof.

One embodiment of the card 10 is a proximity card that includes a radio-frequency identification (RFID) tag as an inlay 16. The RFID tag may be a near field tag that can utilize either high frequencies (HF) or ultra high frequencies (UHF). Cards containing RFID tags may be used for a variety of purposes, such as wireless payments for commercial transactions, transportation fares, or security clearance.

Figure 4:
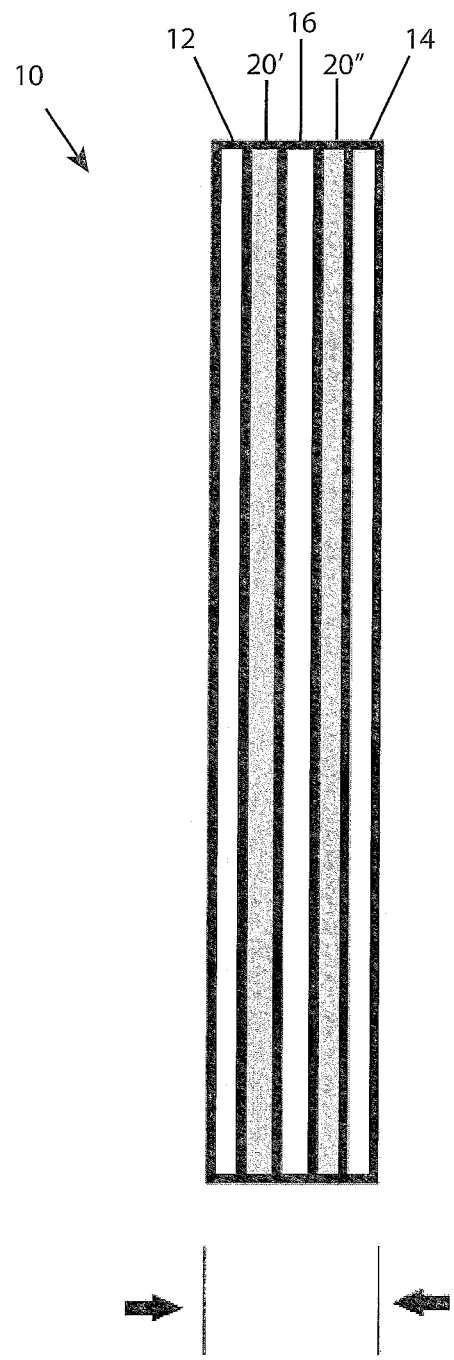
FIG. 4 is a cross-sectional view of the proximity card shown in FIGS. 3A and 3B.

The implementation of RFID tags within cards have traditionally required thick cards to prevent damage to the RFID tag during normal handling. However, the use of a high elongation adhesive enables the production of cards with a lower thickness. Turning to FIG. 4, the card 10 may have a total thickness between about 5 and 35 mils. In one embodiment, the total thickness of the card is about 30 mils. The top 12 or bottom ply 14 may be between about 1.5 mils to about 20 mils in thickness per ply. Each layer of adhesive 20 may be about 1 mil in thickness. Each layer of inlay 16 may be between 2 to 3 mils in thickness.

Figure 5:
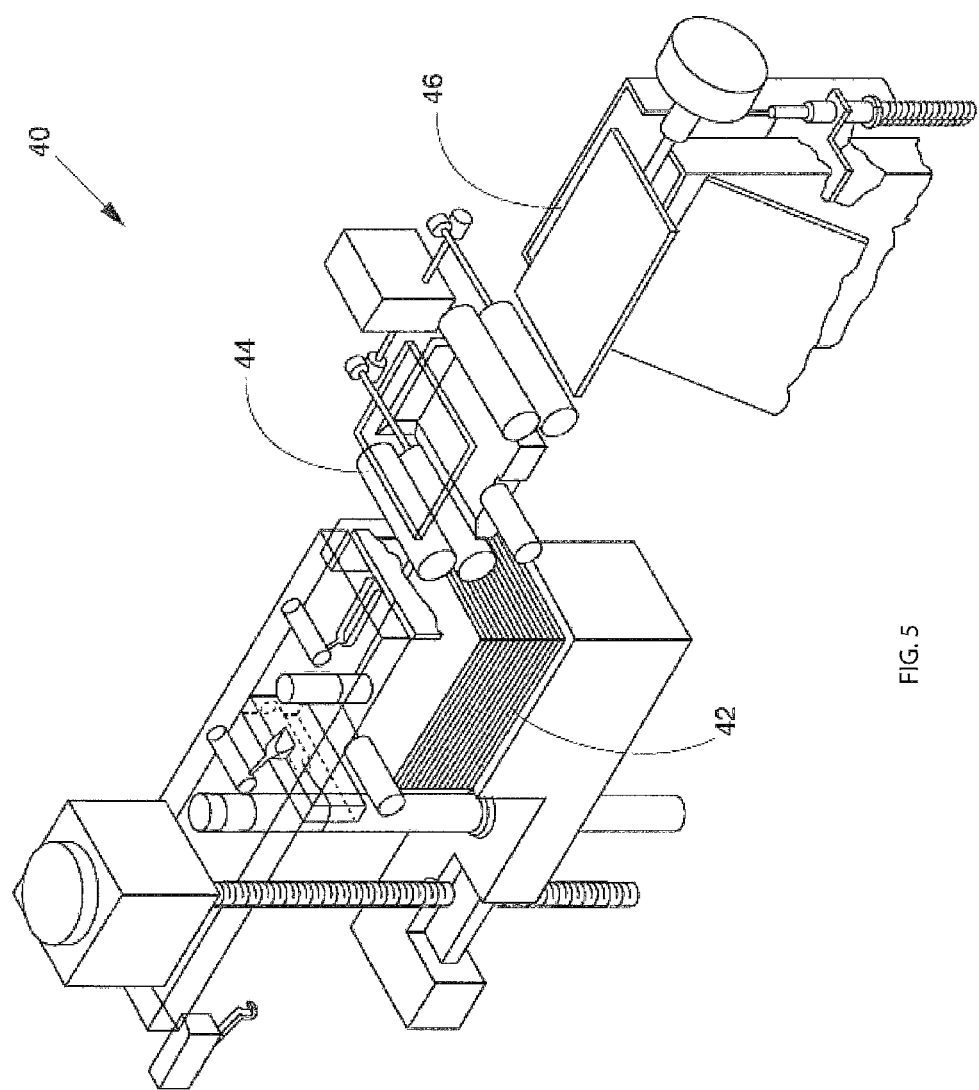
FIG. 5 is a perspective view of one embodiment of a magazine fed card dispenser constructed according to the present inventions.
Figure 6:
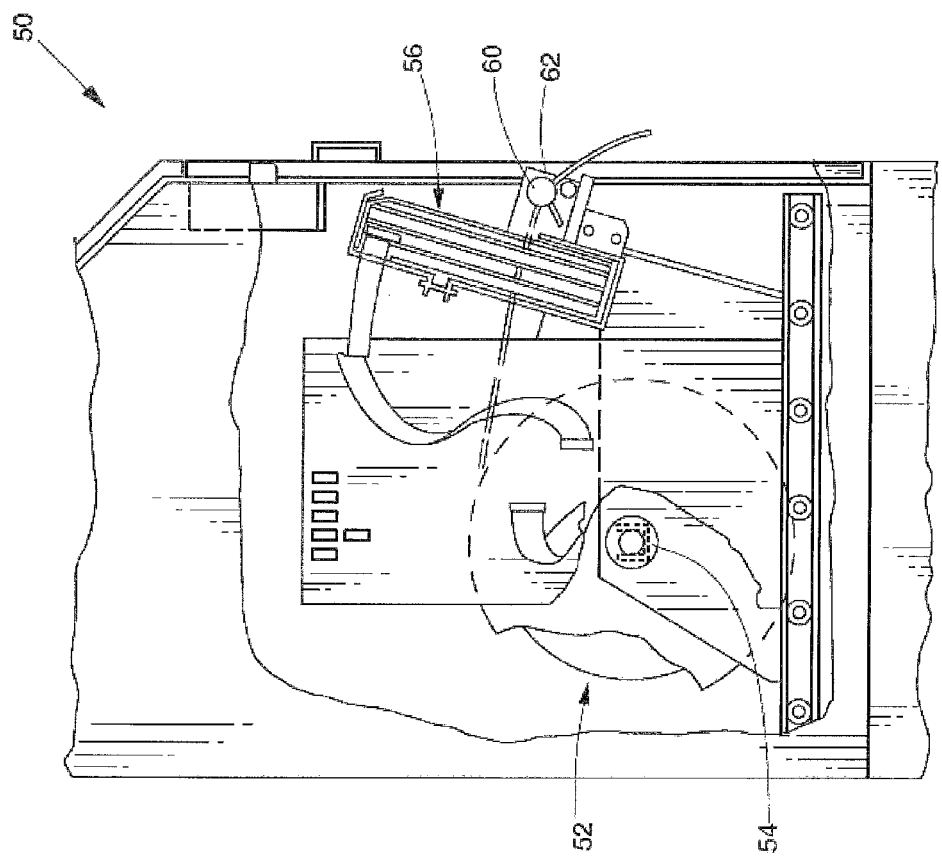
FIG. 6 is a cross-sectional view of one embodiment of a roll card dispenser constructed according to the present inventions.

A variety of dispensers may be utilized to label and distribute cards with the improved properties as disclosed herein. FIG. 5 illustrates one embodiment where the dispenser is a magazine fed card dispenser 40. The magazine fed card dispenser 40 may include a feed magazine 42, at least one feed roll 44 and a metering gate 46. In another embodiment, the dispenser may be a roll card dispenser 50 as shown in FIG. 6. The roll card dispenser 50 may include a card initialization module comprising of a card roll stock 52, a feed roller 54, a printer 56, a card cutter 60 and a delivery chute 62.

The adhesive 20 applied in the present inventions is a high elongation adhesive. One example of a high elongation adhesive is a reactive hot melt polyurethane adhesive that may be polymerized in the presence of moisture. The reactive hot melt polyurethane adhesive has a glass transition temperature (Tg) less than about 32 degrees Fahrenheit (0 degrees Celsius) as tested according to ASTM E1356-08 (2014). In one embodiment, the reactive hot melt polyurethane adhesive has a Tg less than about 15 degrees Fahrenheit (−10 degrees Celsius). In another embodiment, the reactive hot melt polyurethane adhesive as a Tg less than about 5 degrees Fahrenheit (−15 degrees Celsius). The high elongation adhesive has a tensile strength greater than about 1500 psi (10 MPa) as tested according to ASTM D638-10. In one embodiment, the adhesive has a tensile strength greater than about 2500 psi (~17 MPa). In another embodiment, the adhesive has a tensile strength greater than about 3000 psi (~20 MPa). In one embodiment, the adhesive has an elongation greater than about 500% as tested according to ASTDM D638-10. In another embodiment, the adhesive has an elongation of about 600%.

Figure 7:
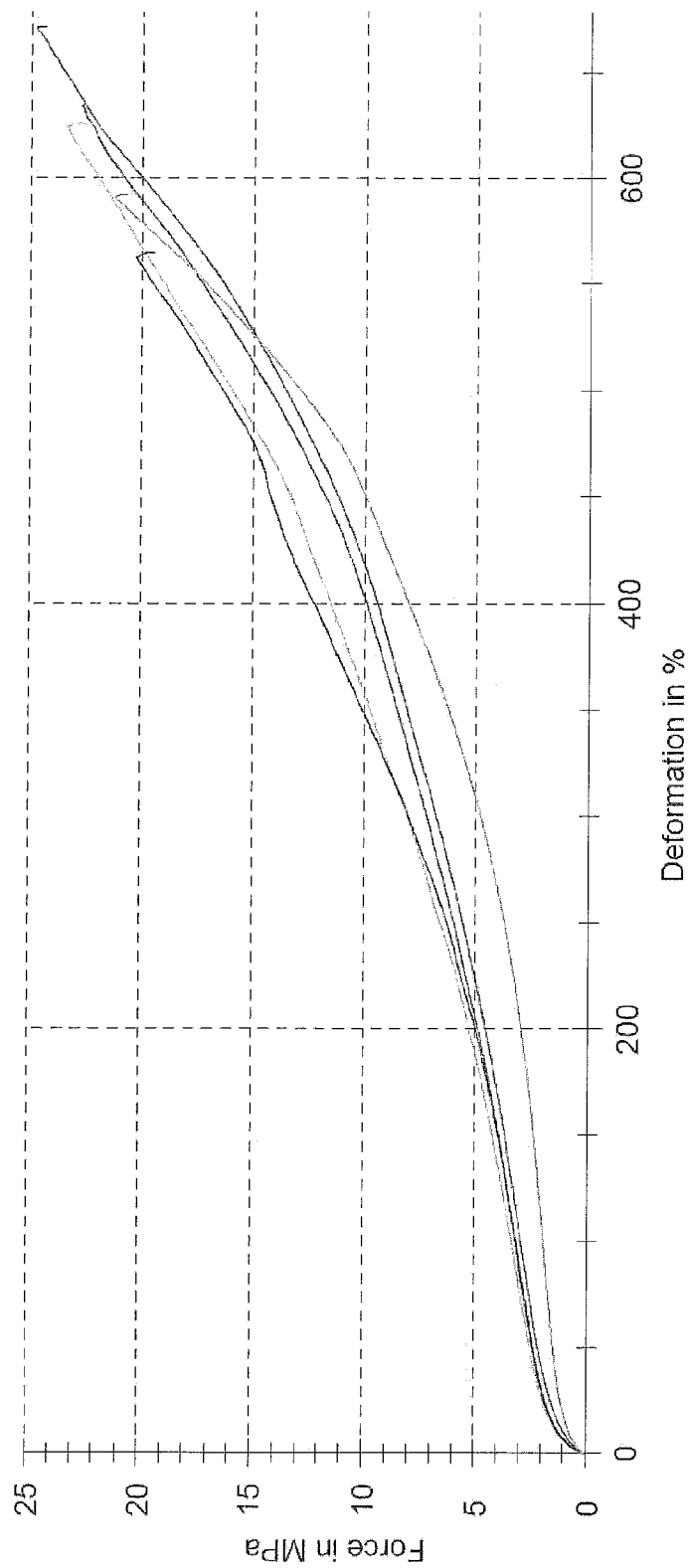
FIG. 7 is a graph of tensile test results for an acceptable PUR adhesive illustrating its low initial tensile value and wide range of elongation.

One example of a reactive hot melt polyurethane (PUR) adhesive is Jowatherm Reactant 630.00, available for purchase from Jowat Adhesives. A useful test for measuring the tensile properties of an adhesive is the dog bone shape test as outlined in ASTM D-638-10. Turning first to Table 1, defonnation tests were conducted on samples containing the 630.00 adhesive at 0.6 millimeters thick with a 50 mm/min test speed. FIG. 7 is a plot showing the amount of force required to deform the material over the percent deformation of the material. The average change in deformation prior to the material breaking (denoted as dL (Break) in Table 1) was 617.5%. The average force required to break the material ($F_{max}$) was 22.46 MPa. The 630.00 adhesive thus retains high tensile strength while exhibiting high elasticity and elongation over a wide range.

Figure 8:
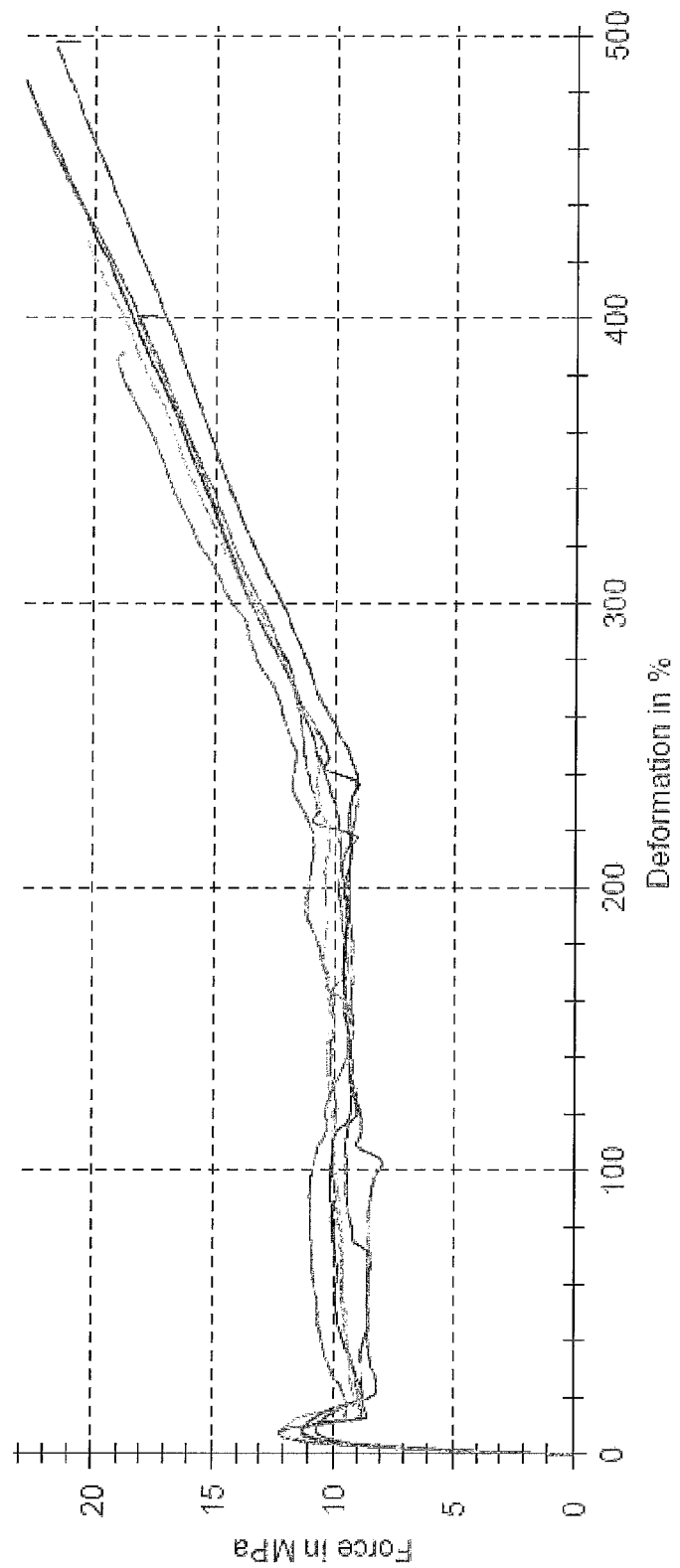
FIG. 8 is a graph of tensile test results for an unacceptable PUR adhesive illustrating its higher initial tensile value and lower range of elongation.

In comparison, Table 2 provides tensile test results for an unacceptable adhesive (Jowatherm Reactant 605.50) that possesses higher initial tensile strength and a lower elongation range less suitable for use in the present inventions. As shown in FIG. 8, the 605.50 adhesive possesses high tensile strength but exhibits lower elasticity in comparison to the 630.00 adhesive. While the average $F_{max}$ required to break the material 20.80 MPa, the average dL (Break) was 445.5%.

TABLE 1

Dog bone shape test (according to ASTM D-638 -10) results for 630.00 adhesive

| Part No. | $F_{max}$ N | $F_{max}2$ MPa | $F_{Break}$ N | dL (Break) % | $a_0$ mm |
|---|---|---|---|---|---|
| 1 | 79.2 | 23.36 | 76.4 | 625.3 | 0.53 |
| 2 | 90.1 | 22.70 | 89.4 | 634.7 | 0.62 |
| 3 | 101 | 24.75 | 99.7 | 670.9 | 0.64 |
| 4 | 54.4 | 20.25 | 52.3 | 564.5 | 0.42 |
| 5 | 67.9 | 21.22 | 65.5 | 592.0 | 0.5 |

TABLE 2

Dog bone shape test (according to ASTM D-638 -10) results for 605.50 adhesive

| Part No. | $F_{max}$ N | $F_{max}2$ MPa | $F_{Break}$ N | dL (Break) % | $a_0$ mm |
|---|---|---|---|---|---|
| 1 | 90.2 | 21.67 | 86.1 | 497.8 | 0.65 |
| 2 | 66.6 | 18.26 | 63.8 | 401.2 | 0.57 |
| 3 | 92.5 | 22.95 | 92.5 | 484.3 | 0.63 |
| 4 | 76.7 | 20.32 | 76.6 | 427.4 | 0.59 |
| 5 | 85.1 | 22.54 | 85.1 | 474.7 | 0.59 |
| 6 | 69.5 | 19.06 | 68.6 | 387.8 | 0.57 |

A "pass-fail" bending test was used for screening the elongation and tensile strength properties of cards constructed according to the present inventions. Specifically, bending tests were conducted for cards produced with a high elongation adhesive and possessing thicknesses of either 15, 27 or 76 mils to determine whether the NFC cards remained functional and could be read. The bending tests were performed on 50 cards for 15 and 27 mils each, while bending tests were performed on 10 cards that were 76 mils thick. Each card was bent over and around rods of decreasing diameters. While all the 15 mil cards were capable of bending around rods with a diameter less than 1 inch and remained functional, neither the 27 mil nor the 76 mil cards were capable of bending around rods with a diameter less than 1 inch and remain functional and no data could be collected for those points.

Turning to Table 3, it shows the number of NFC cards (out of the total number performed) that remained functional after being bent around a rod with a specified diameter. While all 27 mil and 15 mil cards constructed according to the present inventions remained functional after each bend test of bending around rods with a diameter down to 1 inch, one of 76 mil cards became nonfunctional after wrapping around a 1-inch diameter rod. Only the 15 mil cards constructed according to the present inventions remained functional after being bent around rods with a diameter of less than 1 inch and remain functional. Accordingly, the results show that a card constructed according to the present inventions and about 30 mil in thickness is capable of withstanding moderate deformation and remaining functional despite the deformation and a card constructed according to the present inventions and about 15 mil in thickness is capable of withstanding extreme deformation and remaining functional despite the deformation.

TABLE 3

Bending test for RFID cards

| Rod Diameter (inches) | 27 mil Card | 15 mil Card | Standard Card (76 mil) |
|---|---|---|---|
| 2 | 50 | 50 | 10 |
| 1.5 | 50 | 50 | 10 |
| 1.25 | 50 | 50 | 10 |
| 1 | 50 | 50 | 9 |
| 0.75 | N/A | 50 | N/A |
| 0.50 | N/A | 50 | N/A |
| 0.25 | N/A | 50 | N/A |

*Data not available where indicated by N/A due to inability of card to bend around rod.

Figure 9:
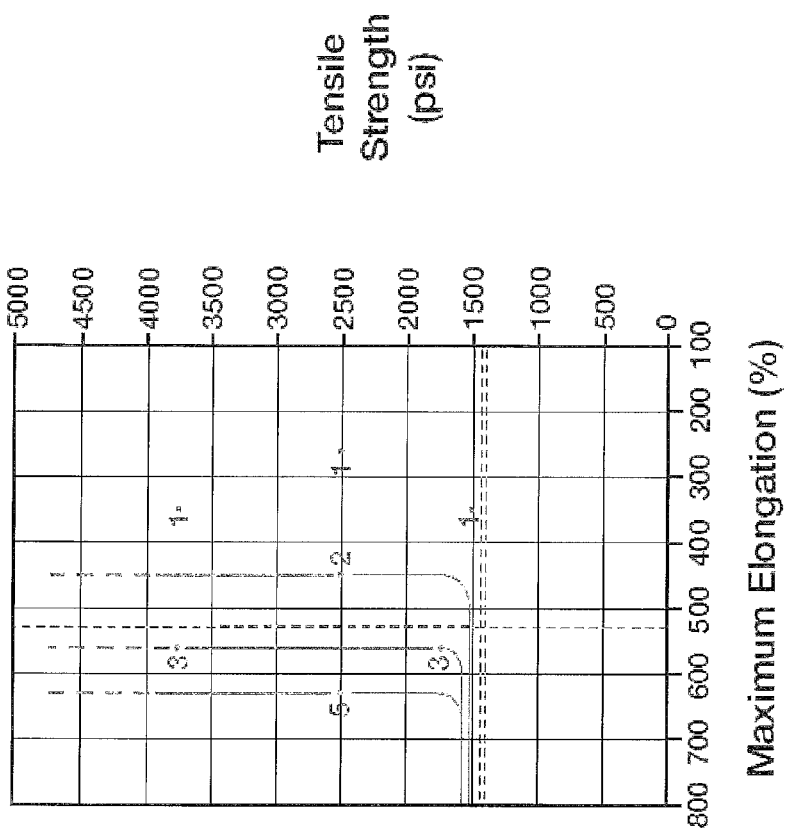
FIG. 9 is a graphical representation of a response surface illustrating the relationship of the elongation and the tensile strength of adhesives on the performance of proximity cards constructed according to the present inventions.

FIG. 9 is a graphical representation of a response surface illustrating the relationship of the elongation and the tensile strength of adhesives on the performance of proximity cards constructed according to the present inventions. The response surface provides a visual illustration of the effects of both the elongation and the tensile strength of an adhesive via a two-dimensional surface plot of a three-dimensional surface.

Accordingly, the expected characteristics of various adhesives, such as hot melt PUR adhesives, were plotted and zones on the response surface were ranked from 1 to 5 with 1 being the poorest performing proximity cards and 5 being the best performing transaction cards in terms of durability of an embedding RFID tag and the resistance of the card to separation of layers.

As can be seen, adhesives having both sufficiently high tensile strength to resist peeling and sufficiently high elongation to prevent damage to the embedded RFID tag were the best performing, while adhesives having lower tensile strength and/or lower percent elongation were less desirable since either peeling or damage to the embedded RFID tag occurred.

The boundary conditions in FIG. 9 are denoted with dashed lines, and indicate the minimum tensile strength and the satisfactory percent elongation of adhesives for use in the present inventions. According to the ASTM D638-10 dog bone shape test, the percent elongation represents the bend of the adhesive material as a force is applied to the material. The maximum elongation derived from this test is the percent elongation value prior to the material breaking. Maximum elongation is a measure of elasticity of the adhesive and is inversely proportional to the adhesive's modulus of elasticity. Therefore, adhesives having a lower modulus of elasticity would have a higher maximum elongation than adhesives having a higher modulus of elasticity.

As can be seen in FIG. 9, the tensile strength of an adhesive used in the present inventions preferably would be greater than about 1500 psi (10 MPa) and have a maximum elongation of at least about 500% as tested according to ASTM D638-10.

Certain modifications and improvements will occur to those skilled in the art upon a reading of the foregoing description. By way of example, while the present inventions refer to "proximity cards," it should be understood that the present inventions may also be adapted for cards of any other type of purpose. Further, while the specification discloses two types of dispensers, the card constructed according to the present inventions may be used in conjunction with other compatible dispensers. It should be understood that all such modifications and improvements have been deleted herein for the sake of conciseness and readability but are properly within the scope of the following claims.

We claim:

1. A two-ply transaction card system, said card system comprising:
    (a) only one top ply formed of a single layer of paper, plastic and combinations thereof;
    (b) only one bottom ply formed of a single layer of paper, plastic and combinations thereof; and
    (c) a layer of high elongation adhesive between said only one top ply and said only one bottom ply, said high elongation adhesive having a tensile strength greater than about 1500 psi (10 MPa) and an elongation greater than about 500% as tested according to ASTM D638-10, wherein said only one top ply and said only one bottom ply are bonded to one another.

2. The card system according to claim 1 further including a card dispenser adapted to dispense said card.

3. The card system according to claim 2, wherein said card dispenser is a magazine fed card dispenser.

4. The card system according to claim 3, wherein the magazine fed card dispenser includes a feed magazine, at least one feed roll, and a metering gate.

5. The card system according to claim 2, wherein said card dispenser is a roll stock card dispenser.

6. The card system according to claim 2, wherein said card system further includes a card initialization module.

7. The card system according to claim 6, wherein said card initialization module includes a cut card on roll mechanism, feed rollers, printer and delivery chute.

8. The card system according to claim 1, wherein said plastic is a thermoplastic.

9. The card system according to claim 8, wherein said thermoplastic is selected from the group consisting of polyester, polypropylene, PVC and mixtures thereof.

10. The card system accordingly to claim 1, wherein only one top ply and said only one bottom ply are between about 1½ mils and about 20 mils in thickness per ply.

11. The card system according to claim 1 further including a coating for providing scratch resistance during normal use of the card, wherein said coating is applied to at least one outer surface of one of said only one top ply and said only one bottom ply.

12. The card system according to claim 1 further including a coating for providing sticking resistance between adjacent cards when the card is dispensed, wherein said coating is applied to at least one outer surface of one of said only one top ply and said only one bottom ply.

13. The card system according to claim 1 further including a coating for reducing the coefficient of friction between adjacent cards when the card is dispensed, wherein said coating is applied to at least one outer surface of one of said only one top ply and said only one bottom ply.

14. The card system according to claim 1 further including indicia applied to at least one outer surface of one of said only one top ply and said only one bottom ply.

15. The card system according to claim 14, wherein said indicia includes identification, customer name, disclaimers on back, customer logo, dollar amount, signature panel, time period for use, and combinations thereof.

16. A two-ply proximity card, said card comprising:
    (a) only one top ply formed of a single layer of paper, plastic and combinations thereof;
    (b) only one bottom ply formed of a single layer of paper, plastic and combinations thereof;
    (c) an inlay between said only one top ply and said only one bottom ply;
    (d) a layer of high elongation adhesive between each of said only one top ply and said only one bottom ply and said inlay, said high elongation adhesive having a tensile strength greater than about 1500 psi (10 MPa) and an elongation greater than about 500% as tested according to ASTM D638-10,
        wherein said only one top ply is bonded to one side of said inlay and said only one bottom ply is bonded to the opposite side of said inlay.

17. The card according to claim 16, wherein said high elongation adhesive is a reactive hot melt polyurethane adhesive.

18. The card according to claim 17, wherein said reactive hot melt polyurethane adhesive is polymerized in the presence of moisture.

19. The card according to claim 17, wherein said reactive hot melt polyurethane adhesive has a glass transition temperature Tg less than about 32 degrees F. (0 degrees C.) as tested according to ASTM E1356-08(2014).

20. The card according to claim 19, wherein said reactive hot melt polyurethane adhesive has a glass transition temperature Tg less than about 15 degrees F. (−10 degrees C.) as tested according to ASTM E1356-08(2014).

21. The card according to claim 20, wherein said reactive hot melt polyurethane adhesive has a glass transition temperature Tg of about 5 degrees F. (−15 degrees C.) as tested according to ASTM E1356-08(2014).

22. The card according to claim 17, wherein said reactive hot melt polyurethane adhesive has a tensile strength greater than about 2500 psi (17 MPa) as tested according to ASTM D638-10.

23. The card according to claim 22, wherein said reactive hot melt polyurethane adhesive has a tensile strength of about 3000 psi (20 MPa) as tested according to ASTM D638-10.

24. The card according to claim 17, wherein said reactive hot melt polyurethane adhesive has an elongation of about 600% as tested according to ASTM D638-10.

25. The card according to claim 17, wherein each of said reactive hot melt polyurethane adhesive layers is about one mil in thickness per layer.

26. The card according to claim 16, wherein said at least one inlay is an RFID tag.

27. The card according to claim 26, wherein said RFID tag is a near field tag.

28. The card according to claim 16, wherein said at least one inlay is about 2½ mils in thickness.

29. The card according to claim 28, wherein the total thickness of said card is between about 5 and 35 mils.

30. The card according to claim 29, wherein the total thickness of said card is about 30 mils.

31. The card according to claim 16, wherein said card is die cut.

32. A two-ply proximity card system, said card system comprising:
    (a) a card having (i) only one top ply formed of a single layer of paper, plastic and combinations thereof, (ii) only one bottom ply formed of a single layer of paper, plastic and combinations thereof; (iii) an inlay between said only one top ply and said only one bottom ply; and (iv) a layer of high elongation adhesive between each of said only one top ply and said only one bottom ply and said inlay, said high elongation adhesive having a tensile strength greater than about 1500 psi (10 MPa) and an elongation greater than about 500% as tested according to ASTM D638-10; and (b) a card dispenser adapted to dispense said card,
wherein said only one top ply is bonded to one side of said inlay and said only one bottom ply is bonded to the opposite side of said inlay.

33. The card system according to claim 32, wherein said card dispenser is a magazine fed card dispenser.

34. The card system according to claim 33, wherein the magazine fed card dispenser includes a feed magazine, at least one feed roll, and a metering gate.

35. The card system according to claim 32, wherein said card dispenser is a roll stock card dispenser.

36. The card system according to claim 32, wherein said card system further includes a card initialization module.

37. The card system according to claim 36, wherein said card initialization module includes a cut card on roll mechanism, feed rollers, printer and delivery chute.

38. The card system according to claim 32, wherein said plastic is a thermoplastic.

39. The card system according to claim 38, wherein said thermoplastic is selected from the group consisting of polyester, polypropylene, PVC and mixtures thereof.

40. The card system accordingly to claim 32, wherein said only one top ply and said only one bottom ply are between about 1½ mils and about 20 mils in thickness per ply.

41. The card system according to claim 32 further including a coating for providing scratch resistance during normal use of the card, wherein said coating is applied to at least one outer surface of one of said only one top ply and said only one bottom ply.

42. The card system according to claim 32 further including a coating for providing sticking resistance between adjacent cards when the card is dispensed, wherein said coating is applied to at least one outer surface of one of said only one top ply and said only one bottom ply.

43. The card system according to claim 32 further including a coating for reducing the coefficient of friction between adjacent cards when the card is dispensed, wherein said coating is applied to at least one outer surface of one of said only one top ply and said only one bottom ply.

44. The card system according to claim 32 further including indicia applied to at least one outer surface of one of said only one top ply and said only one bottom ply.

45. The card system according to claim 44, wherein said indicia includes identification, customer name, disclaimers on back, customer logo, dollar amount, signature panel, time period for use, and combinations thereof.

46. The card according to claim 32, wherein said high elongation adhesive is a reactive hot melt polyurethane adhesive.

47. The card according to claim 46, wherein said reactive hot melt polyurethane adhesive is polymerized in the presence of moisture.

48. The card according to claim 46, wherein said reactive hot melt polyurethane adhesive has a glass transition temperature Tg less than about 32 degrees F. (0 degrees C.) as tested according to ASTM E1356-08(2014).

49. The card according to claim 48, wherein said reactive hot melt polyurethane adhesive has a glass transition temperature Tg less than about 15 degrees F. (−10 degrees C.) as tested according to ASTM E1356-08(2014).

50. The card according to claim 49, wherein said reactive hot melt polyurethane adhesive has a glass transition temperature Tg of about 5 degrees F. (−15 degrees C.) as tested according to ASTM E1356-08(2014).

51. The card according to claim 46, wherein said reactive hot melt polyurethane adhesive has a tensile strength greater than about 2500 psi (17 MPa) as tested according to ASTM D638-10.

52. The card according to claim 51, wherein said reactive hot melt polyurethane adhesive has a tensile strength of about 3000 psi (20 MPa) as tested according to ASTM D638-10.

53. The card according to claim 46, wherein said reactive hot melt polyurethane adhesive has an elongation of about 600% as tested according to ASTM D638-10.

54. The card according to claim 46, wherein each of said reactive hot melt polyurethane adhesive layers is about one mil in thickness per layer.

55. The card according to claim 32, wherein said at least one inlay is an RFID tag.

56. The card according to claim 55, wherein said RFID tag is a near field tag.

57. The card according to claim 32, wherein said at least one inlay is about 2½ mils in thickness.

58. The card according to claim 57, wherein the total thickness of said card is between about 5 and 35 mils.

59. The card according to claim 58, wherein the total thickness of said card is about 30 mils.

60. The card according to claim 32, wherein said card is die cut.

* * * * *

UNITED STATES PATENT AND TRADEMARK OFFICE
CERTIFICATE OF CORRECTION

| | | |
|---|---|---|
| PATENT NO. | : 9,242,436 B1 | Page 1 of 1 |
| APPLICATION NO. | : 14/479727 | |
| DATED | : January 26, 2016 | |
| INVENTOR(S) | : Hallman et al. | |

It is certified that error appears in the above-identified patent and that said Letters Patent is hereby corrected as shown below:

Specification

In Column 4, line 67 and into Column 5, line 1, -defonnation- should be "deformation"

Signed and Sealed this
Seventeenth Day of May, 2016

Michelle K. Lee
*Director of the United States Patent and Trademark Office*